United States Patent [19]
Davis

[11] Patent Number: 4,524,723
[45] Date of Patent: Jun. 25, 1985

[54] REMOVABLE POULTRY NEST BOTTOMS OF VARIABLE WIDTHS

[75] Inventor: Walter G. Davis, Hall County, Ga.

[73] Assignee: NesTier Corporation, Cincinnati, Ohio

[21] Appl. No.: 493,652

[22] Filed: May 11, 1983

Related U.S. Application Data

[63] Continuation of Ser. No. 310,455, filed Oct. 13, 1981, abandoned.

[51] Int. Cl.³ ............................................. A01K 31/16
[52] U.S. Cl. .................................................. 119/45 R
[58] Field of Search .................... 119/45 R, 45 A, 48, 119/17, 28

[56] References Cited

U.S. PATENT DOCUMENTS 3,131,672  5/1964  Mitchell ........................... 119/45 R
3,242,904  3/1966  Rannov ............................... 119/48
3,699,926  10/1972  Stochl .................................. 119/28
4,250,837  2/1981  Cochlereece ......................... 119/48

FOREIGN PATENT DOCUMENTS 2509073  9/1975  Fed. Rep. of Germany ........ 119/28

Primary Examiner—Jay N. Eskovitz
Attorney, Agent, or Firm—Thomas E. Beall, Jr.

[57] ABSTRACT

A unitary synthetic resin nest bottom is molded in one piece with living hinges between side portions and a bottom portion, so that the side portions may be hinged upwardly to accommodate one nest bottom that was molded in one mold to various width nests. A plurality of ribs are provided for reinforcing the nest bottom and for spacing the nest bottom from the nest.

6 Claims, 4 Drawing Figures

REMOVABLE POULTRY NEST BOTTOMS OF VARIABLE WIDTHS

BACKGROUND OF THE INVENTION

Nests for domestic fowl are generally manufactured in at least three sizes. Generally, a poultry farmer will purchase the appropriate size of nest for the type of bird that is being raised, for example, breeders. This is generally an economic decision and is made with a view towrads raising more of the smaller birds in a given size building. Generally, the nest bottoms are made of metal and are removable to allow for cleaning after the birds are marketed. Sometimes the metal is sized for the particular nest and other times a larger size piece of metal is purchased with the sides and the bottoms being bent upward to fit the bottom of the nest structure. The metal bottoms have a serious drawback in that the metal tends to deteriorate in a relatively short period of time due to the chemical composition and decomposition of the excreta and its reaction with the metal.

SUMMARY

It is an object of the present invention to provide an economical nest bottom that will overcome any of the above-mentioned disadvantages of the prior art.

More particularly, the present invention employs a one-piece unitary synthetic resin plastic nest bottom that may be bent to different sizes, so that economically one nest bottom may be used to form a plurality of different-sized nests according to the particular needs at the time, while efficiently forming a plurality of nests having an overall minimum size. The life expectancy of the plastic is much greater than that of metal in this particular environment. Since the nest bottom is adaptable to different sizes, only one mold need be used for a plurality of nest bottom sizes, and further only one nest bottom need be kept in inventory to maintain stock supplies, which are considerable economic advantages. The variable width nest bottom is accomplished by having a rigid center bottom portion and two rigid side portions of the nest bottom attached to each other by means of parallel thin flexible portions of the plastic, that is, living hinges. The thin flexible portion of the device acts as a hinge between the center portions and the side portions to allow the side portions to be bent upwardly along the hinge, thus allowing one nest bottom to be used in most nest sizes. Rigid side walls are provided at the ends of the bottom portion. Ribs are provided for reinforcing and spacing of the bottom portion and side portions from the nest.

BRIEF DESCRIPTION OF THE DRAWING

Further objects, features, and advantages of the present invention will become more clear from the following detailed description of a preferred embodiment shown in the accompanying drawing, wherein.

DETAILED DESCRIPTION

The nest bottom consists of side portions 1 hingedly secured by means of thin-wall living hinges 2 to opposite longitudinal sides of a central rectangular bottom portion 3, and reinforcing ribs. The reinforcing ribs are of a plurality of types; namely, five parallel ribs extending downwardly from the central bottom portion; ribs extending downwardly from the side portions, as shown in FIG. 1, and rigid wall ribs extending upwardly from the opposite ends of the bottom portion between the side portions.

Figure 1:
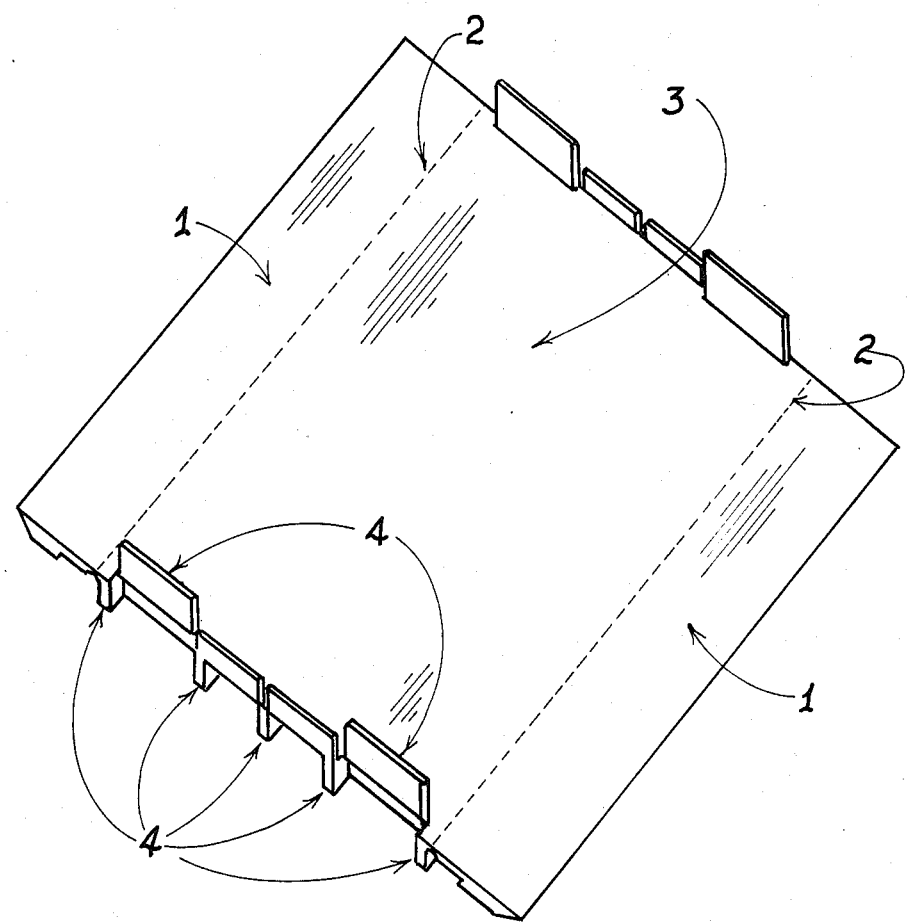
FIG. 1 shows a perspective view of the nest bottom with the side portions shown in the normal flat position.

The nest bottom is molded in one piece in a single mold from a soft inert plastic, such as polypropylene or polyethylene, in a normal or unstressed position as shown in FIG. 1. The thin, flexible hinge portions extend continuously along the opposite longitudinal sides of the central bottom portion to allow the side portions 1 to be bent upward along the hinges to various angular positions from the flat coplanar position of FIG. 1 to a vertical position, so as to provide different widths between such positions. Thereby, one nest bottom may be used in most size nests. The plastic nest bottoms are much easier to clean, maintain, installed and removed than the previously known metal nest bottoms. Also, the life of a plastic nest bottom can be expected to be many times that of a metal nest bottom, due to the lack of chemical reaction between excreta of the birds and the nest bottom.

The present invention overcomes known problems, primarily: (a) the various size nests require the manufacture of several size molds for injection purposes in other known plastic nest bottoms; and (b) the manufacture, stocking, warehousing, and distributing of various size nest bottoms of a rigidly plastic type known in the prior art is much more expensive than for the nest bottom of the present invention wherein only one size nest bottom may be easily adapted by being bent to various size nests.

Consequently, the present invention is made to overcome the drawbacks of the prior art mentioned above with respect to multiple size nests. The present nest bottom fits most domestic fowl nests. The entire nest bottom consists of synthetic resin molded in one piece in one mold in one injection molding process. Since the nest bottoms are of variable widths, only one mold is necessary and only one item may be stocked, warehoused, and distributed for a plurality of nest sizes.

Figure 2:
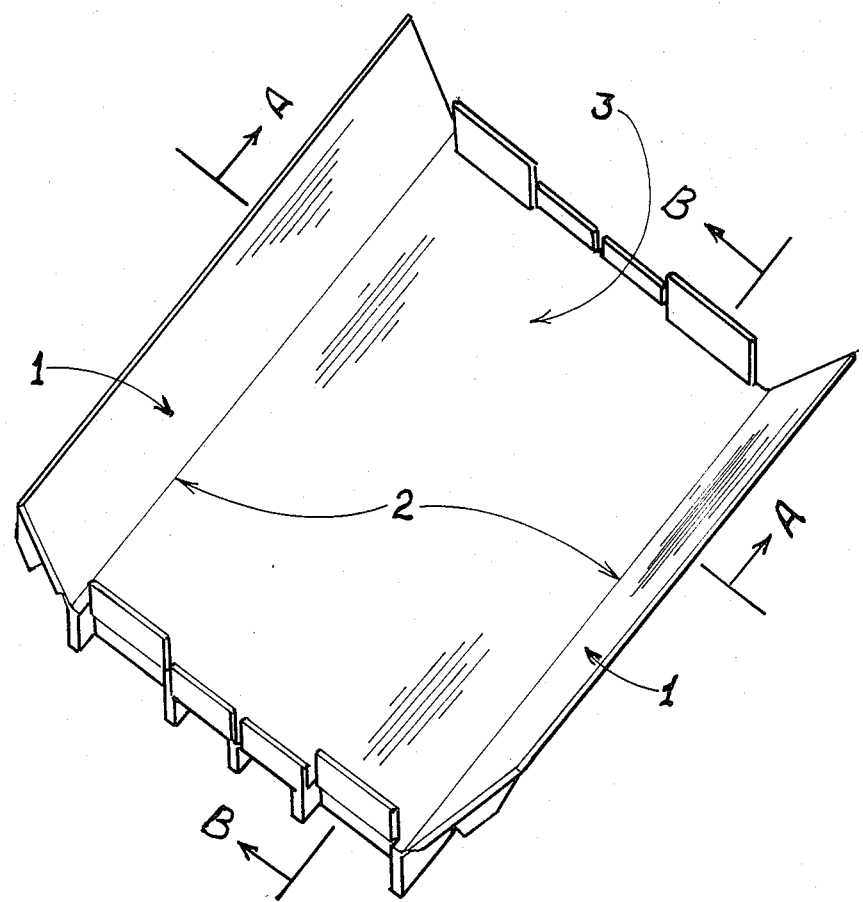
FIG. 2 shows a perspective view of the nest bottom with the side portions bent in an upright position along the hinges to provide a smaller nest bottom than in FIG. 1.
Figure 3:
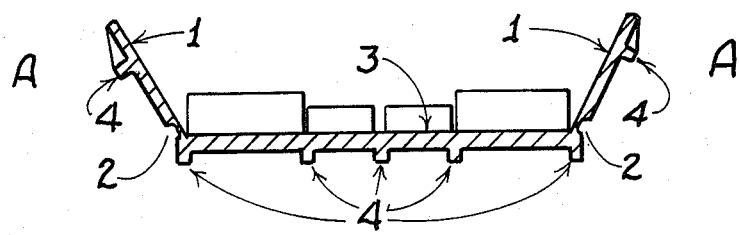
FIG. 3 shows a cross-sectional view taken along line A—A of FIG. 2.
Figure 4:
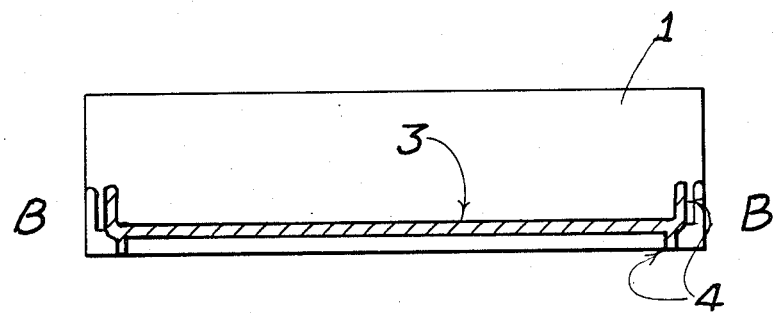
FIG. 4 shows a cross-sectional view taken along line B—B in FIG. 2.

The bottom portion 3 and side portions 1 comprise planar sheet material having a common flat top surface in the unstressed normal position of FIG 1. The hinge portions 2 are of thinner sheet material and flexible to allow the side portions 1 to be folded in an upward manner relative to the bottom portion 3, as shown in FIG. 2, to provide for the various width nests. The material of the hinges 2 is such as to prevent breakage due to material fatigue, while providing for the resilient hinging, and they are sufficiently thick to allow for flexibility.

To ensure the rigidity of the bottom portion 3 and the side portions 1, variously reinforcing ribs 4 are molded both to the bottom portion 3 and to the side portions 1 in the same molding process as previously described, so as to extend downwardly as shown in FIG. 1.

It may be seen from FIG. 1 that the ribs 4 that form the rigid upstanding side or end walls are such that two rigid side wall portions are located closely adjacent, but spaced from each other in a direction perpendicular to the hinges 2, in the central portion of the end wall of the bottom portion, and in turn they are spaced in a direction parallel to the hinges from outer rigid wall portions that are respectively adjacent to the hinges 2. The ribs that extend downwardly from the bottom portion are generally vertically lined with the spacings between adjacent rigid wall portions and the hinges, so as to provide for rigidity of the structure. The downwardly depending ribs 4 space the bottom portion and the side portions respectively from the bottom and sides of the nest.

While a preferred embodiment has been described in detail, further embodiments, modifications, and variations are all contemplated according to the spirit and scope of the present invention as defined by the following claims.

I claim:

1. A removable poultry nest bottom of variable width, to be selectively placed within poultry nests of various sizes comprising:
    said nest bottom consisting entirely of synthetic resin molded in one piece;
    a rigid bottom portion of rectangular shape having two opposite sides and two opposite ends;
    at least two rigid side portions;
    integral sheet material hinge means respectively connecting said side portions to said sides of said bottom portion so that said bottom portion and side portions lie in a common plane in the normal unstressed condition of said hinges, with said side portions being on opposite sides of said bottom portion;
    said bottom portion and side portions being constructed of planar sheets having a thickness substantially greater than the thickness of said hinge means, and further having coplanar flat top surfaces in the unstressed normal position;
    a plurality of rib means extending downwardly from the bottom surface of said side portions and said bottom portion for reinforcing said sheets and spacing said sheets away from the support surfaces of the nest;
    said hinge means being sufficiently thin and flexible to permit resilient movement of said side portions between the normal position and a position extending upwardly at right angles to said bottom portion selectively without material fatigue; and
    said hinges being continuous throughout the length of said side portions and bottom portion.

2. The nest bottom according to claim 1, further including end wall ribs rigidly extending upwardly at right angles from said bottom portion along said opposite ends of said bottom portion between said side portions.

3. The nest bottom according to claim 2, wherein said rigid side walls each comprise a plurality of separate wall portions spaced from each other, and together substantially extending along the entire width of their respective end sides of said bottom portion.

4. The nest bottom according to claim 3, wherein each of said rigid end wall ribs consist of two rigid inner end wall portions in a common vertical plane, of planar sheet material, spaced apart in the direction perpendicular to said hinge means and located adjacent each other in the central portion of respective ends of said bottom portion, and two additional rigid outer end wall portions on opposite sides of said inner end wall portions, respectively adjacent said side portions and in a vertical plane spaced from the vertical plane of said rigid inner end wall portions in a direction parallel to said hinges.

5. The nest bottom according to claim 4, wherein said inner and outer rigid end walls are of a height substantially less than the height of said side portions when said side portions are in their vertical position.

6. The nest bottom according to claim 4, wherein said rib means extend generally parallel to said hinges and are respectively vertically aligned with said hinges and the spaces between adjacent rigid end wall portions.

* * * * *

UNITED STATES PATENT AND TRADEMARK OFFICE
CERTIFICATE OF CORRECTION

PATENT NO. : 4,524,723

DATED : June 25, 1985

INVENTOR(S) : Walter G. Davis

It is certified that error appears in the above-identified patent and that said Letters Patent is hereby corrected as shown below:

On the title page, assignee should read:

-- (73) Assignee: Buckhorn Material Handling Group Inc. --.

Signed and Sealed this

Eighth Day of October 1985

[SEAL]

Attest:

DONALD J. QUIGG

Attesting Officer

Commissioner of Patents and Trademarks—Designate